June 28, 1960 C. M. EASON 2,942,708
AIR OPERATED CLUTCH-BRAKE MECHANISM
Filed April 2, 1956 2 Sheets-Sheet 1

INVENTOR.
Clarence M. Eason
BY Brown, Jackson,
Boettcher & Dienner
Attys.

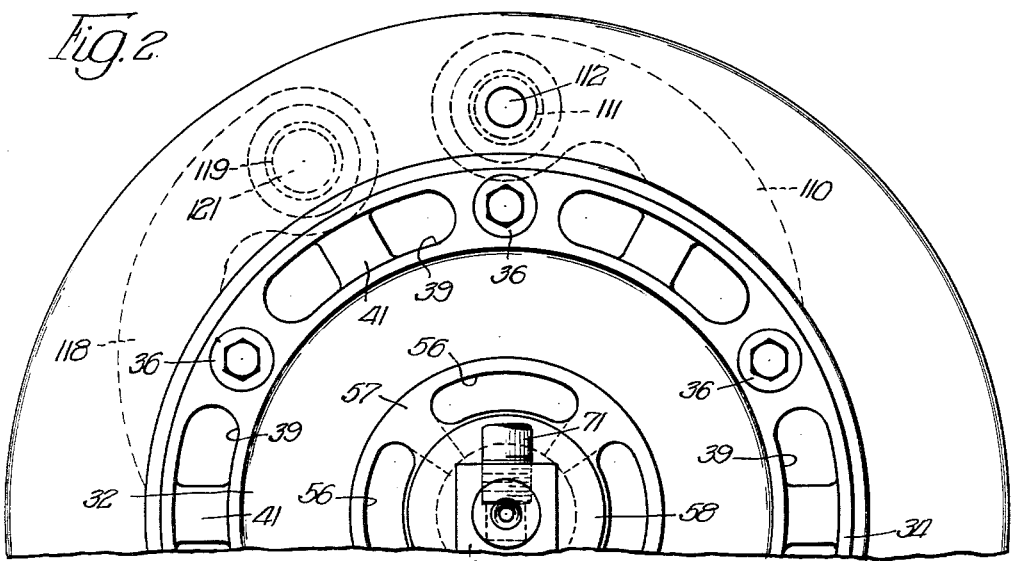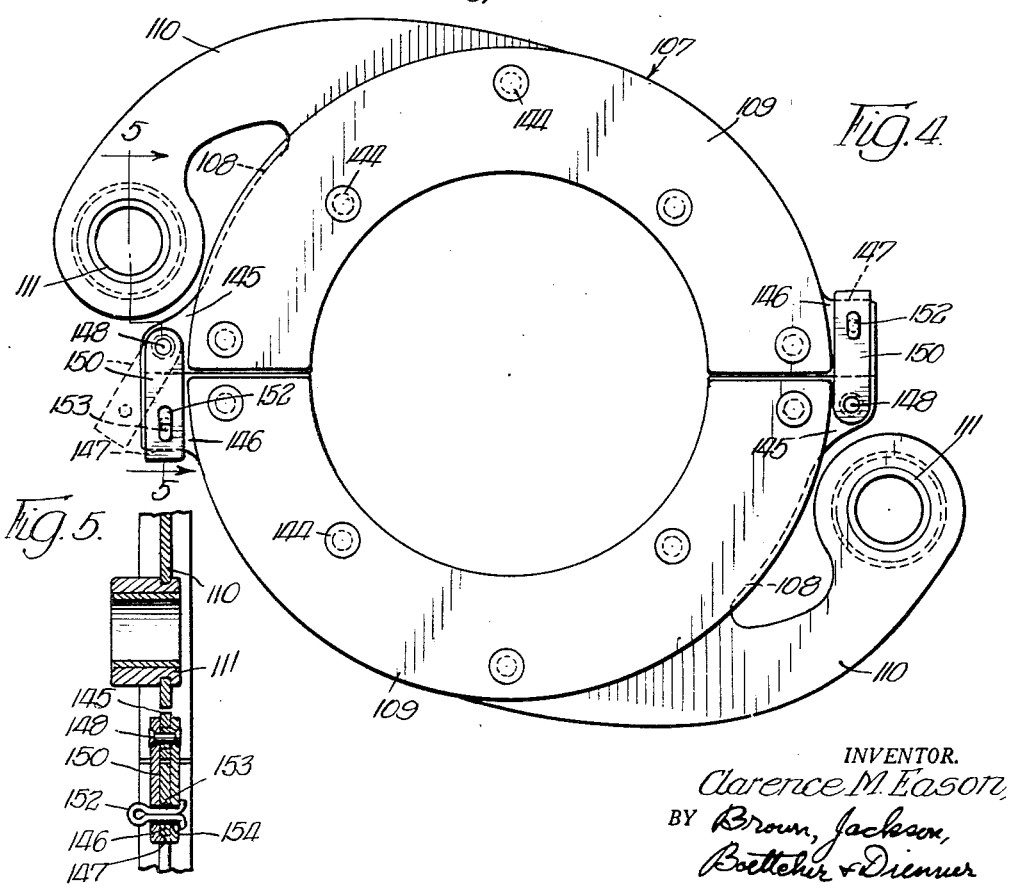

United States Patent Office 2,942,708
Patented June 28, 1960

2,942,708

AIR OPERATED CLUTCH-BRAKE MECHANISM

Clarence M. Eason, Waukesha, Wis., assignor to Industrial Clutch Corporation, Waukesha, Wis., a corporation of Wisconsin Filed Apr. 2, 1956, Ser. No. 575,538

11 Claims. (Cl. 192—18)

The present invention relates to compressed air operated clutch-brake mechanism, and more particularly of the type adapted to operate punch presses, dieing machines, power shears and similar machines requiring start-stop operation.

In many of these start-stop machines using friction clutches, operating speeds of several hundred revolutions per minute are becoming quite prevalent, and there is a constant trend of development toward higher speeds. In such machines adapted for single stroke operation (as well as continuous running operation), the kinetic energies involved in effecting single stroke operation at these speeds are extremely large. For example, in punch presses having single stroke operation at these speeds the kinetic energy loss in starting and stopping the ram in a single revolution of the driving fly wheel is so large that success or failure of the clutch-brake mechanism is dependent upon reducing the mass or inertia of those parts of the clutch-brake mechanism which must be started and stopped with each single stroke operation.

The general object of the present invention is to provide an improved air operated clutch-brake mechanism in which the clutch-brake parts which are started and stopped with each operation of the mechanism are of minimum mass so that they can be started and stopped with minimum loss of kinetic energy.

In a typical installation of my invention, the clutch-brake mechanism is mounted on a driven shaft projecting outwardly from the frame of the punch press, power shear or like machine, on which driven shaft is also mounted the driving fly wheel which is adapted to be coupled to the driven shaft through the clutch mechanism. In this regard, another object of the invention is to provide a construction of air operated clutch-brake mechanism in which the clutch mechanism and the brake mechanism are coaxially mounted on the driven shaft between the machine frame and the driving fly wheel, and in which the compressed air cylinder and piston are mounted on the outer side of the driving fly wheel and rotate continuously therewith so that their mass does not have to be started and stopped with each intermittent operation of the driven shaft.

Another object of the invention is to provide clutch-brake mechanism of the above general description in which the compressed air power unit transmits thrusting motion to the clutch-brake mechanism through the instrumentality of a thrust transmitting preliminary clutch which effects preliminary clutching engagement between the driving fly wheel and the driven shaft before the main clutch engages. This two-stage clutching operation is advantageous in numerous machines, but the advantages are particularly exemplified in punch presses, where the preliminary engagement of this supplemental or preliminary clutch serves to start the ram downwardly before the main clutch engages, following which the later engagement of the main clutch transmits the heavy torque required to drive the dies into or through the work.

Another object of the invention is to provide an improved removable segment construction of the driving clutch disk and stationary brake disk.

Other objects, features and advantages of the invention will appear from the following detail description of one preferred embodiment thereof. In the accompanying drawings illustrating such embodiment:

Figure 2 is a fragmentary front elevational view thereof;

Figure 4 is a fragmentary elevational view of the removable friction disc segments employed in the clutch mechanism and in the brake mechanism; and Figure 5 is a detail sectional view taken on the plane of the line 5—5 of Figure 4.

Figure 1:
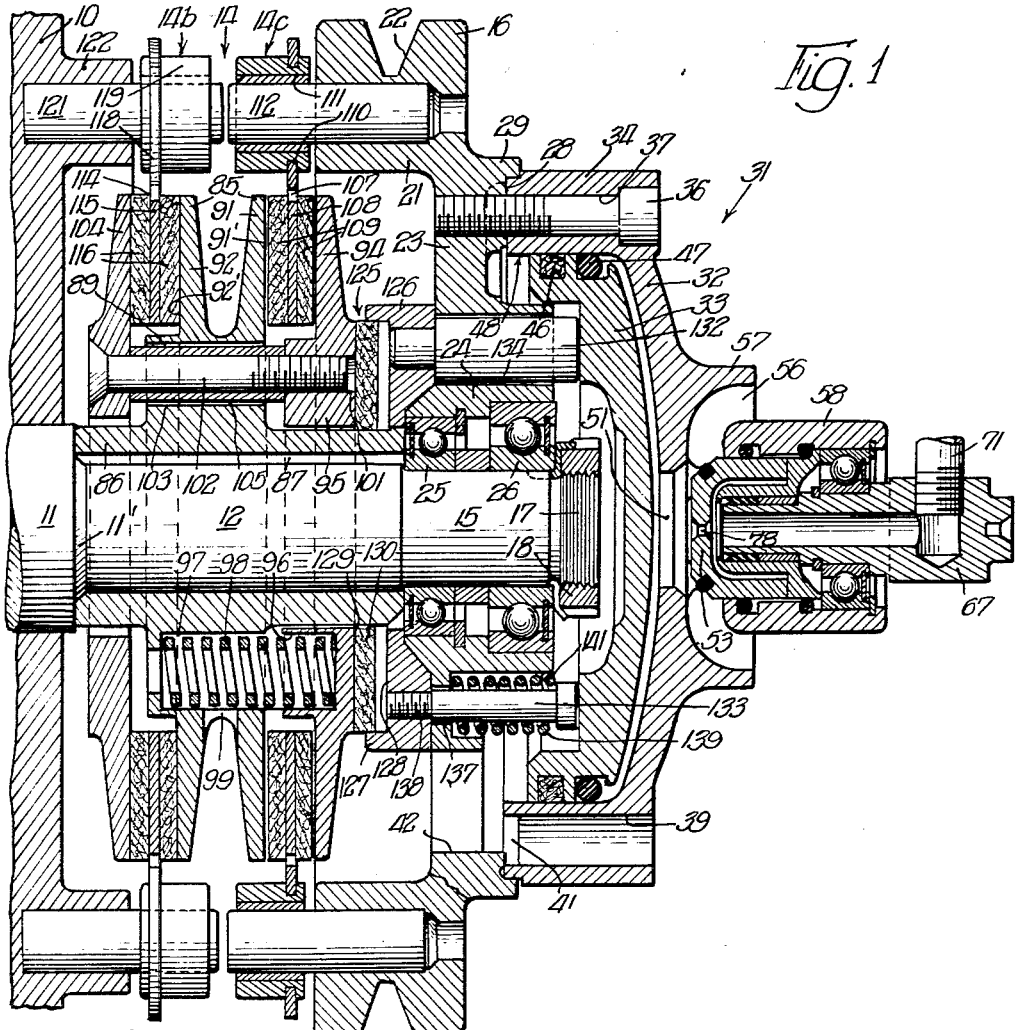
Figure 1 is an axial sectional view of my improved air operated clutch-brake mechanism.

The frame of the punch press, dieing machine or other intermittently driven apparatus is indicated at 10, and extending outwardly from one side or end of said frame is the driven shaft 11 that requires start-stop operation. In the case of a punch press, this shaft 11 would ordinarily constitute the crank shaft of the press. This shaft has an inner reduced portion 12 on which the clutch-brake mechanism 14 is mounted, and it also has an outer reduced portion 15 on which the driving fly wheel 16 is mounted. A threaded extremity 17 on the end of the shaft receives a nut 18 for holding the assembly mounted on the shaft.

The periphery or outer flange 21 of the driving fly wheel 16 is formed with one or more V-shaped grooves 22 therein for receiving one or more driving belts of V-shaped section. Offset outwardly from the driving periphery 21 are the web 23 and mounting hub 24 of the fly wheel. The mounting hub 24 is rotatively mounted on inner and outer anti-friction bearings 25, 26 held on the outer reduced section 15 of the shaft by the nut 18.

Machined in the outer face of the fly wheel web 23 is a flat seating surface 28 surrounded by a confining flange 29. Secured to this flat seating surface 28 is the compressed air power unit 31 which comprises a cylinder 32 and a piston 33 reciprocably mounted therein. The cylinder 32 is formed with a peripheral flange or skirt 34 which has a radially flat inner face that seats against the flat seating surface 28 on the fly wheel web 23. The cylinder 32 is secured to the fly wheel by cap screws 36 which pass through bores 37 in the flange 34 and thread into tapped holes in the fly wheel web 23. Intermediate the bores 37 the flange 34 is formed with arcuate ventilating slots 39 which are centrally bridged by bridging webs 41 (Figure 2). Formed at angularly spaced points in the fly wheel web 23 are ventilating openings 42, and the location of the ventilating slots 39 at the outer ends of the ventilating openings 42 induces a flow of cooling air through the openings 42 and slots 39.

The piston 23 has a relatively short skirt portion in which are formed two external grooves mounting a dirt excluding ring 46 of rectangular felt section, and a neoprene sealing ring 47 of O-section, which has a sliding sealing fit with the cylindrical wall 48 of the cylinder. Formed centrally in the head of the cylinder 32 is a relatively large air admission and exhaust port 51 provided with an outwardly opening beveled valve seat 52. Adapted for seating on the valve seat 52 is a relatively large quick release exhaust valve 53 having an O-type of neoprene sealing ring 54 mounted in its beveled inner edge which is adapted to have seating engagement with the valve seat 52. Extending from the port 51 are curved exhaust passageways 56 which are formed in a large central boss 57 projecting from the outer face of the cylinder head. Formed integral with and extending from the outer end of the large boss 57 is a smaller boss 58 which serves as a guide for the quick release exhaust valve 53. The exhaust valve 53 has a sliding fit in a bore 61 formed in the smaller boss 58, and recessed in this bore 61 is an O-type neoprene sealing ring 62 having a snug sliding fit with the skirt of the exhaust valve 53. The outer end of the bore 61 is formed with an enlarged counterbore 63 in which is seated the outer race of an antifriction bearing 64, preferably a ball bearing. A snap type of locking ring 65 snaps into a groove in the counterbore 63 and holds the bearing in place in the counterbore. It will be recalled that the cylinder 32, piston 33 and all of the parts subsequently described revolve continuously with the driving fly wheel 21. Stationarily mounted in the inner race of the ball bearing 64 is an air admission spindle 67. The spindle has an axial passageway 68 therethrough, which communicates at its outer end with a threaded pipe bore 69, which is adapted to receive the air admission pipe or tube 71. This pipe or tube 71 is connected to an electrically responsive 3-way control valve (not shown) which is operative to connect the pipe or tube 71 either with a source of compressed air or with an outlet to atmosphere. Such a 3-way control valve is conventional and well known, one typical embodiment thereof being illustrated in my prior Patent 2,585,234.

The inner end of the axial bore 68 of air admission spindle 67 opens into the space 72 defined within and at the outer end of the quick release exhaust valve 53. This space 72 is sealed from discharge out through the ball bearing 64 through the medium of a packing gland member 73 having an outer flange 74 which is held by the outer race of the bearing 64 in abutment with an O-type of neoprene sealing ring 75 located at the juncture between the inner bore 61 and the outer counterbore 63. It will be noted that a compressed bearing or sealing engagement is established on opposite sides of the O-ring 75 by the counterbore shoulder in the boss 58 and by the flange 74 on the gland member 73. The spindle 67 has a reduced inward extension 76, and confined between this inward extension and the cylindrical portion of the gland member 73 are an "Oilite" bronze bushing 77 and a neoprene sealing ring 77'. The air admission space 72 opens to the inner side of the exhaust valve 53 through a centrally located restricted orifice 78 in the head of the exhaust valve 53. The inner race of the ball bearing 64 is locked to the stationary spindle 67 between a shoulder 81 and a locking ring 82 snapped into a groove in the spindle.

It will be noted that the sealing ring 62 is of larger diameter than the poppet seating ring 54. In consequence thereof, the right hand end of the valve 53, which end is subjected to the pressure of the entering compressed air, is of larger area than the left hand end within the confines of the poppet seating ring 54, which left hand end is subjected to the pressure of the air within the cylinder 32. Because of these differential areas, as soon as compressed air is admitted to the spindle passageway 68 the valve 53 moves to the left into seating engagement with the valve seat 52, and remains in engagement therewith as long as compressed air is maintained in the passageway 68. The aforementioned 3-way valve is preferably located in immediate proximity to the quick release valve 53, and has large port areas for performing quick release and exhaust functions. When this 3-way valve opens to admit compressed air, the sudden inrush of compressed air blows the valve 53 over into the closed position, in which position it remains as long as compressed air is applied to the right hand end thereof, owing to the larger area of this end over the left hand end within the confines of the seating ring 54. As soon as the valve 53 seats against the valve seat 52, the compressed air enters the cylinder 32 through the restricted orifice 78, thereby releasing the brake and engaging the clutch, as will be presently described. The size of the orifice 78 is predetermined or regulated depending upon the speed at which it is desired to release the brake and engage the clutch at the initiation of the cycle.

Figure 3:
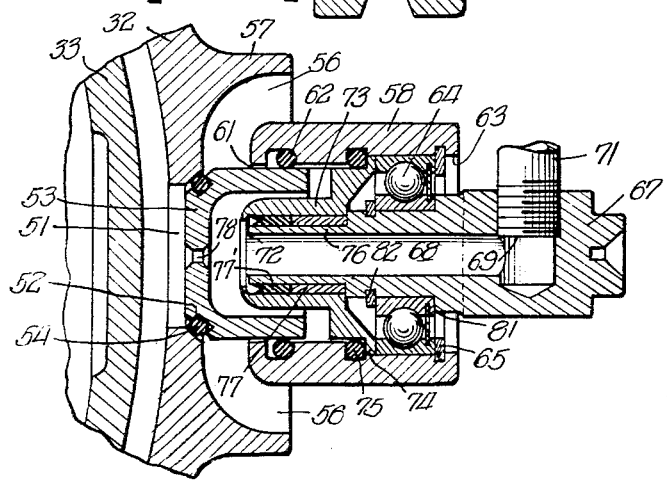
Figure 3 is a fragmentary axial sectional view of the quick release exhaust valve and seal on a larger scale.

When the 3-way valve is opened to its atmospheric exhaust outlet for performing the reverse operation of releasing the clutch and engaging the brake, the sudden drop in pressure in the spindle passageway 68 results in a sudden pressure differential between the interior of the cylinder and the passageway 68, which blows the valve 53 off the valve seat 52 to thereby effect a very sudden discharge of air from the cylinder to atmosphere through the exhaust passageways 56. This releases the clutch and engages the brake under the action of spring pressure, as will be later described. The orifice 78 in the head end of the valve 53 does not impede or slow down the abrupt closing and abrupt opening of the valve 53 because of the small size of this orifice compared to the sudden inrush and outrush of air pursuant to the operation of the 3-way valve. Figure 1 shows the poppet exhaust valve 53 in open exhausting position, and Figure 3 shows it in closed air admitting position.

Referring now to the construction of this clutch-brake mechanism 14, it comprises clutch mechanism designated 14c, and brake mechanism designated 14b. Intermediate these two mechanisms and constituting a part of both is a non-shifting hub plate or clutch-brake element 85 which comprises a mounting sleeve or hub 86 mounted on the inner reduced portion 12 of the driven shaft. The sleeve or hub 86 is keyed to rotate with the shaft by a key 87 engaging in keyways in the sleeve and in the shaft, and the hub 86 is also held against shifting movement along the shaft by virtue of one end of the hub bearing against shoulder 11' and the other end of the hub bearing against the inner race of inner ball bearing 25. Extending outwardly from the hub 86 is an annular boss portion 89, and extending outwardly from this boss portion in closely spaced side-by-side relation are a non-shiftable clutch plate or disc 91 and a non-shiftable brake plate or disc 92. The outwardly facing surface 91' of the clutch plate 91 constitutes a friction clutch surface, and the opposite or inwardly facing surface 92' of the brake plate 92 constitutes a friction brake surface, this clutch surface 91' and brake surface 92' both rotating directly with the driven shaft 11.

The clutch 14c is engaged and released by the axial shifting of a driven friction clutch plate 94 which is spaced outwardly of the non-shiftable driven clutch disc 91. This shiftable driven clutch plate 94 has a thickened hub portion 95. Extending laterally into the hub 95 are angularly spaced pockets 96 which align or match with angularly spaced pockets 97 formed in the boss portion 89 of the combined clutch-brake element 85. Confined in these matching pockets are compression springs 98 which normally tend to hold the shiftable clutch plate 94 shifted to the right in clutch releasing position. There are preferably three or more of these main compression springs 98. Ventilating openings 99 open from each spring pocket 97 outwardly into the space between the plate portions 91 and 92 for ventilation.

At angularly spaced points between the spring receiving pockets 96, the hub 95 is provided with threaded holes 101 into which the threaded ends of machine screws 102 thread. These machine screws 102 pass through holes 103 in the boss portion 89 of the intermediate hub plate or clutch-brake element 85. Mounted on the other ends of the screws 102 is a shiftable rotatable brake plate 104. Spacing sleeves 105 encircle the shanks of the screws 102 between the shiftable clutch plate 94 and the shiftable brake plate 104, these spacing sleeves having free sliding mounting in the holes 103 through hub portion 89. It will thus be seen that the clutch plate 94 and brake plate 104 are rigidly tied together by the bolts 102 and spacing sleeves 105, of which there are preferably three or more pairs. The main compression springs 98 in tending to thrust the shiftable clutch 94 toward the right into clutch releasing position also tend to thrust the brake plate 104 toward the right into brake engaging position, through pulling action exerted through the screw bolts 102 and spacing sleeves 105.

Arranged to coact between the driven non-shiftable friction clutch surface 91′ and the shiftable clutch plate 94 is a driving friction clutch disc 107 which rotates continuously with the driving fly wheel 16. This driving clutch disc 107 is made up of arcuate sheet metal segments 108, each having friction facing segments 109 secured to the opposite sides thereof. As will be hereinafter described in detail, each of these arcuate segments 108 is provided with an outwardly extending, laterally flexible spring arm 110 having a tubular bushing 111 anchored in its outer end. This tubular bushing 111 has slidable mounting over a driving pin 112 which is anchored by a drive fit in the peripheral flange 21 of the driving fly wheel 16 and which extends inwardly from this peripheral flange. The lateral flexibility of the spring arm 110 and the slidable mounting of the tubular bushing 111 on driving pin 112 insures that the driving clutch disc 107 will move out of substantial pressure engagement against the driven friction clutch surface 91′ and the driven clutch plate 94 when the clutch is released.

Mounted between the inwardly facing surface 92′ of the rotatable brake disc 92 and the shiftable brake plate 111 is a non-rotatable brake disc 114, which is substantially a duplicate of the driving clutch disc 94. That is to say, it comprises the same relation of separable sheet metal segments 115 having segments 116 of friction material riveted to opposite sides thereof. This brake disc 114 also has outwardly extending flexible spring arms 118 provided at their outer ends with tubular bushings 119. These tubular bushings 119 are slidably mounted on braking pins 121 which have anchored drive fits in bosses 122 projecting outwardly from the machine frame 10. The lateral flexibility of the spring arms 118 and the slidable mounting of the bushings 119 on the pins 121 enables the non-rotative brake disc 114 to move laterally out of dragging frictional engagement with both of the rotatable brake plates 92 and 104 when these two brake plates separate.

The relatively heavy compression springs 98 normally hold the conjointly shiftable clutch and brake plates 94 and 104 shifted toward the right, in the position shown in Figure 1. In this spring urged position, the clutch stands released and the brake stands engaged, this latter function resulting from the clamping frictional grip of the two rotatable brake plates 92 and 104 against the opposite sides of the non-rotatable brake disc 114. Shifting of the clutch and brake plates 94 and 104 toward the left against the pressure of the compression springs 98 operates to release the brake and engage the clutch, the latter function resulting from the clamping frictional grip of the two driven clutch plates 91 and 94 against the opposite sides of the driving clutch disc 107.

This latter operation of shifting the shiftable clutch and brake plates 94 and 104 toward the left against the pressure of the springs 98 is performed by the air operated piston 33 through the instrumentality of a supplemental clutch designated 125. This supplemental clutch comprises a thrusting clutch ring 126 which is normally held in abutment against the fly wheel web 23. The inner face of this ring 126 is formed with a radially extending clutch surface 128 surrounded by a confining flange 127. Opposing this clutch surface 128 is a radially extending clutch surface 129 on the outer face of clutch plate hub 95. Disposed between the two clutch surfaces 128 and 129 is a ring-shaped disc 130 composed of frictional material of any well known type. The compressed air stroke of the piston 33 is transmitted to the clutch ring 126 through three or more push studs 132 and spring bolts 133. The push studs 132 are slidably mounted in bores 134 in the fly wheel hub 24, and have reduced inner ends which are anchored in holes in the clutch ring 126. The spring bolts 133 have heads which bear against the back thrusting surface of the piston, and have shanks which pass freely through holes 137 in the fly wheel hub 24. The inner reduced ends 138 of these bolts are threaded for reception in tapped holes in the clutch ring 126. Relatively light compression springs 139 confined between the heads of the spring bolts and the bottoms of counterbores 141 in hub 24 normally tend to hold the piston 33 and clutch ring 128 thrust to the right with the thrust ring abutting the inner side of the fly wheel hub 24.

In the operation of my improved clutch-brake mechanism, when the piston 33 starts moving toward the left under compressed air actuation, it first brings the preliminary clutch 125 into engagement before the main clutch 14c engages, so that some preliminary torque tends to be transmitted from the fly wheel 16 through this preliminary clutch 125 to the driven shaft 11 concurrently with the releasing of the brake mechanism 14b. The continued inward shifting movement of the supplemental clutch 125 in this engaged torque transmitting condition effects the release of the brake mechanism 14b by shifting the shiftable brake plate 104 into brake releasing position. In typical punch press adaptations of the clutch-brake mechanism, the initial torque transmitted through preliminary clutch 125 concurrently with the release of the brake mechanism 14b is sufficient to start the ram of the press descending toward the work before the main clutch 14c is fully engaged. As the brake mechanism becomes fully released the main clutch mechanism 14c becomes fully engaged by the action of the shiftable driven clutch plate 94 compressing the driving clutch disc 107 between itself and the non-shiftable driven clutch plate 91. Hence, the main clutch 14c picks up the torque load initially started by the preliminary clutch 125, and when the full load portion of the work cycle is encountered the main clutch 14c is fully engaged. The supplemental clutch remains engaged as long as the main clutch is engaged, and thus the two clutches function conjointly to transmit torque from the fly wheel 16 to the driven shaft 11.

In the reverse operation of releasing the clutch and engaging the brake, the exhaust of compressed air from the cylinder 32 allows the relatively heavy compression springs 98 to thrust the piston 33 toward the right and to effect release of the clutch and reengagement of the brake by the right hand shifting movement of the plates 94 and 104. After the main compression springs 98 have moved the shiftable plate assembly 94 and 104 toward the right as far as it will go, as determined by the shiftable brake plate 104 compressing the non-rotatable brake disc 114, the smaller compression springs 139 on the spring bolts 133 continue the motion of the clutch ring 126 toward the right until the supplemental clutch surfaces 128, 129 and 130 are completely separated substantially into the positions illustrated in Figure 1, in which positions there is no possibility of dragging friction occurring in this supplemental or preliminary clutch 125.

In Figures 4 and 5 I have shown the improved construction of friction disc segments and tie links employed in the driving clutch disc 107, it being understood that this same identical construction is also preferably employed in the non-rotatable brake disc 114. Each friction disc is preferably divided into two semi-circular segments 108, each having semi-circular segments 109 of friction material secured thereto by rivets 144. The laterally flexible arms or fingers 110 project outwardly and circumferentially from intermediate portions of the segments 108, substantially as shown. That end of each segment lying adjacent to the tubular bushing 111 in the spring arm 110 is provided with an outwardly projecting pivot lug 145. The opposite end of each segment has an outwardly projecting hook lug 146 provided with a hook or locking shoulder 147. Embracing the opposite sides of each pivot lug 145 and pivotally mounted thereon by pivot pin 148 is a U-shaped tie link 150. The closed end of this U-shaped tie link is adapted to embrace the hook lug 146 and to engage in locking engagement over the locking shoulder 147. The tie link is adapted to be releasably held in this locking position by a cotter pin 152 inserted through aligned holes 153 and 154 formed in the hook lug 146 and tie link 150 respectively.

When it is desired to remove the friction disc segments for inspection, repair or replacement, it is only necessary to remove the cotter pins 152 and then swing the tie links 150 outwardly to positions clear of the locking shoulders 147, as indicated in dotted lines in Figure 4. Thereupon, each segment can be revolved around the axis of the mounting pin 112 to a position clear of the clutch plates 91 and 94. If it is merely desired to inspect the friction facings on the segments, this can be done with the segments still remaining on the mounting pins 112. If it is desired to repair or replace the segments the tubular bushings 111 are slid off the ends of the mounting pins 112. It will be seen that by providing each segment with only one spring arm 110, and by having the bushed end 111 of this spring arm located near one end of the segment, the segment is free to be swung outwardly around the axis of the bushed end 111 without having the adjacent end of the segment swing inwardly through an arc which would strike the hub portion 95 of the shiftable clutch plate 94. It will be obvious that the driving pins 112 will have to be revolved into positions out of alignment with the braking pins 121 when it is desired to remove either the clutch disc segments or the brake disc segments from their respective mounting pins.

While I have illustrated and described what I regard to be the preferred embodiment of my invention, nevertheless it will be understood that such is merely exemplary and that numerous modifications and rearrangements may be made therein without departing from the essence of the invention.

I claim:

1. In air operated clutch-brake mechanism for controlling the starting and stopping of a power driven shaft which is rotatably mounted in a supporting frame and which has one end projecting from said frame, the combination of a power driven fly wheel rotatably mounted on the projecting end of said shaft, main clutch mechanism mounted between said driving fly wheel and said frame and including a driven clutch surface non-shiftably mounted on said driven shaft for clutching said driving fly wheel to said driven shaft, brake mechanism mounted between said driving fly wheel and said frame and operative when engaged to exert braking retardation on the rotation of said driven shaft, a single compressed air power unit comprising an expansible chamber mounted on the outer side of said driving fly wheel, and motion transmitting mechanism comprising a preliminary clutch located between said expansible chamber and said main clutch mechanism for transmitting actuating motion resulting from the expansion of said expansible chamber to said main clutch mechanism and to said brake mechanism, said preliminary clutch and said main clutch mechanism both responding to the operation of said single compressed air power unit, with said preliminary clutch establishing preliminary clutching engagement between said fly wheel and said driven shaft before said main clutch mechanism engages.

2. In air operated clutch-brake mechanism of the class described for controlling the starting and stopping of a power driven shaft which is rotatably mounted in a supporting frame and which has one end projecting from said frame, the combination of a continuously running power driven fly wheel rotatably mounted on the projecting end of said shaft, main clutch mechanism mounted between said driving fly wheel and said frame for clutching said driving fly wheel to said driven shaft, brake mechanism mounted between said driving fly wheel and said frame and operative when engaged to exert braking retardation on the rotation of said driven shaft, spring means for normally holding said main clutch mechanism released and said brake mechanism engaged, a single compressed air power unit comprising a cylinder and piston mounted on the outer side of said driving fly wheel and rotating continuously therewith, and motion transmitting mechanism for transmitting actuating motion from the piston of said power unit through said fly wheel to said main clutch mechanism and said brake mechanism for releasing said brake mechanism and engaging said main clutch mechanism in opposition to the action of said spring means, said motion transmitting mechanism comprising a supplemental clutch mounted between said compressed air power unit and said main clutch mechanism and operative to transmit actuating motion from said single compressed air power unit to said main clutch mechanism, whereby to establish preliminary clutching engagement between said fly wheel and said driven shaft before said main clutch mechanism engages.

3. In air operated clutch-brake mechanism for controlling the starting and stopping of a power driven shaft which is rotatably mounted in a supporting frame and which has one end projecting from said frame, the combination of a driving fly wheel rotatably mounted on the projecting end of said shaft, clutch mechanism mounted between said driving fly wheel and said frame comprising shiftable and non-shiftable driven clutch plates and a driving clutch disc adapted to be gripped between said driven clutch plates, said driving clutch disc being connected to said driving fly wheel, brake mechanism mounted between said driving fly wheel and said frame comprising shiftable and non-shiftable brake plates and a stationary brake disc adapted to be gripped between said brake plates, said stationary brake disc being secured to said frame, a common hub structure non-shiftably keyed to said shaft and from which said non-shiftable clutch plate and said non-shiftable brake plate both extend radially in closely spaced side-by-side relation, means for joining said shiftable clutch plate and said shiftable brake plate into a conjointly shiftable assembly, whereby shifting movement of said assembly in one direction engages said clutch mechanism and releases said brake mechanism and whereby shifting movement of said assembly in the other direction engages said brake mechanism and releases said clutch mechanism, spring means normally tending to shift said shiftable assembly in one direction, a compressed air power unit comprising a cylinder and piston mounted on the outer side of said driving fly wheel and rotating continuously therewith, motion transmitting mechanism for transmitting motion from said piston through said fly wheel to said shiftable assembly for shifting said assembly inwardly in opposition to the action of said spring means, and a preliminary clutch located between said clutch plate and brake plate shiftable assembly and said motion transmitting mechanism through which all inward shifting motion is transmitted from said piston to said shiftable assembly, said preliminary clutch being operative to establish preliminary clutching engagement between said driving fly wheel and said driven shaft before said clutch mechanism engages.

4. In clutch-brake mechanism of the class described, the combination of a machine frame, a driven shaft having one end projecting outwardly from said machine frame, a rotary driving element mounted on said shaft and spaced from said frame, clutch-brake mechanism mounted between said driving element and said frame comprising a combined clutch-brake element secured to said driven shaft between said driving element and said frame and comprising a non-shiftable friction clutch surface and a non-shiftable friction brake surface having non-shiftable keyed attachment to said driven shaft, a driving clutch disc connected to said driving element and adapted to engage said non-shiftable friction clutch surface, a stationary brake disc secured to said frame and adapted to engage said non-shiftable friction brake surface, a shiftable clutch-brake assembly comprising a shiftable clutch plate and a shiftable brake plate both rotating with said driven shaft, said shiftable clutch-brake assembly operating in one direction of shift to grip said driving clutch disc between said non-shiftable friction clutch surface and said shiftable clutch plate and operative in the other direction of shift to grip said stationary brake disc between said non-shiftable friction brake surface and said shiftable brake plate, a compressed air power unit comprising a cylinder and piston mounted on the outer side of said driving element and rotating continuously therewith, motion transmitting mechanism for transmitting motion from said piston through said driving element, and preliminary friction clutch surfaces for transmitting said shifting motion to said shiftable clutch-brake assembly, said preliminary clutch surfaces establishing preliminary clutching engagement between said driving element and said driven shaft before said shiftable clutch-brake assembly engages said clutch elements.

5. In clutch-brake mechanism of the class described, the combination of a stationary frame, concentrically mounted rotatable driving and driven elements, said driven element comprising a central non-shiftable hub having flange means projecting radially outwardly therefrom, said flange means presenting a non-shiftable driven clutch face on one side thereof and presenting a non-shiftable brake face on the opposite side thereof, a shiftable driven clutch plate spaced axially from said non-shiftable clutch face, a shiftable rotatable brake plate spaced axially from said non-shiftable brake face, apertures extending transversely through said driven element at radii spaced inwardly from said non-shiftable driven clutch face and said non-shiftable brake face, interconnecting means extending through said apertures and rigidly joining said shiftable driven clutch plate and said shiftable rotatable brake plate into a rigid conjointly shiftable and conjointly rotatable unit, a driving clutch disc mounted for axial shifting movement on said driving element and interposed between said non-shiftable clutch face and said shiftable clutch plate, a stationarily anchored brake disc mounted for axial shifting movement on said frame and interposed between said non-shiftable brake face and said shiftable brake plate, springs carried by said driven element normally holding said conjointly shiftable unit shifted axially in one direction, a compressed air power unit comprising an expansible chamber mounted on the outer side of said clutch-brake mechanism, and means for transmitting shifting motion in the opposite direction from said power unit to said shiftable driven clutch plate and thence directly through said rigid interconnecting means to said shiftable rotatable brake plate, whereby the inward shifting movement caused by said power unit is transmitted to said shiftable rotatable brake plate before it is transmitted to said shiftable driving clutch disc.

6. In clutch-brake mechanism of the class described, the combination of a driven shaft, concentrically mounted rotatable driving and driven elements, said driven element comprising a central non-shiftable hub mounted on said driven shaft and having flange means projecting radially outwardly therefrom, said flange means presenting a non-shiftable driven clutch face on one side thereof and presenting a non-shiftable brake face on the opposite side thereof, a shiftable driven clutch plate spaced axially from said non-shiftable clutch face, a shiftable rotatable brake plate spaced axially from said non-shiftable brake face, apertures extending transversely through said driven element at radii spaced inwardly from said non-shiftable clutch face and said non-shiftable brake face, interconnecting means extending through said apertures and rigidly joining said shiftable driven clutch plate and said shiftable rotatable brake plate into a rigid conjointly shiftable assembly, said interconnecting means comprising bolts passing between said shiftable plates and spacing sleeves on said bolts between said shiftable plates, an axially shiftable driving clutch disc carried by said driving element and interposed between said non-shiftable clutch face and said shiftable rotatable clutch plate, an axially shiftable brake disc interposed between said non-shiftable brake face and said shiftable rotatable brake plate and having its outer portion stationarily anchored against rotation, pockets in said driven element, aligned pockets in one of said shiftable plates, compression springs confined in said pockets normally holding said conjointly shiftable assembly shifted in one direction, a compressed air power unit comprising an expansible chamber mounted on the outer side of said clutch-brake mechanism, and means for transmitting shifting motion in the opposite direction from said power unit to said shiftable driven clutch plate and thence directly through said rigid interconnecting means to said shiftable rotatable brake plate, whereby the inward shifting movement caused by said power unit is transmitted to said shiftable rotatable brake plate before it is transmitted to said shiftable driving clutch disc.

7. In air operated clutch-brake mechanism for controlling the starting and stopping of a power driven shaft which is rotatably mounted in a supporting frame and which has one end projecting from said frame, the combination of a power driven fly wheel rotatably mounted on the projecting end of said shaft, a brake mechanism comprising a non-rotating friction brake disk made up of a plurality of arcuate brake segments having laterally flexing spring arms extending outwardly therefrom and secured to said frame, a shiftable brake element operative to engage the inner surface of said segmental brake disk facing toward said frame, and a non-shiftable brake element operative to engage the outer surface of said segmental brake disk facing away from said frame, a main clutch mechanism comprising a rotatable friction clutch disk made up of a plurality of arcuate clutch segments having laterally flexing spring arms extending outwardly therefrom and secured to said power driven fly wheel, a non-shiftable clutch element operative to engage the inner surface of said segmental clutch disk facing toward said frame, and a shiftable clutch element operative to engage the outer surface of said segmental clutch disk facing away from said frame, means fixedly joining said non-shiftable brake element and said non-shiftable clutch element with said power driven shaft for rotation concurrently therewith, motion transmitting shifter mechanism joining said shiftable brake element and said shiftable clutch element for concurrent shifting movement, said motion transmitting shifter mechanism extending between said shiftable brake element and said shiftable clutch element within the minimum radii of said segmental brake disk and said segmental clutch disk, spring means normally tending to hold said brake mechanism engaged and said main clutch mechanism released, a preliminary friction clutch comprising a shiftable driven clutch surface and a shiftable driving clutch surface, said shiftable driven clutch surface rotating and shifting with said shiftable brake element and with said shiftable clutch element, said shiftable driving clutch surface of said preliminary clutch rotating with said fly wheel, a compressed air power unit comprising a cylinder and piston mounted on the outer side of said driving fly wheel and rotating continuously therewith, means for admitting compressed air to said power unit, and means for transmitting relative shifting movement between said cylinder and piston to said preliminary friction clutch for preliminarily engaging the same and thereafter transmitting shifting movement to said shiftable brake element and to said shiftable clutch element for releasing said brake mechanism and engaging said main clutch mechanism.

8. In air operated clutch-brake mechanism for controlling the starting and stopping of a power driven shaft which is rotatably mounted in a supporting frame and which has one end projecting from said frame, the combination of a power driven fly wheel rotatably mounted on the projecting end of said shaft, a brake mechanism comprising a non-rotating friction brake disk made up of a plurality of arcuate brake segments having laterally flexing spring arms extending outwardly therefrom and secured to said frame, a shiftable rotatable brake element operative to engage the inner surface of said segmental brake disk facing toward said frame, and a non-shiftable rotatable brake element operative to engage the outer surface of said segmental brake disk facing away from said frame, a friction clutch mechanism comprising a rotatable driving friction clutch disk made up of a plurality of arcuate clutch segments having laterally flexing spring arms extending outwardly therefrom and secured to said power driven fly wheel, a non-shiftable driven clutch element operative to engage the inner surface of said segmental driving clutch disk facing toward said frame, and a shiftable clutch element operative to engage the outer surface of said segmental clutch disk facing away from said frame, means fixedly joining said non-shiftable brake element and said non-shiftable clutch element with said power driven shaft for rotation concurrently therewith, motion transmitting shifter mechanism joining said shiftable brake element and said shiftable clutch element for concurrent shifting movement, said motion transmitting shifter mechanism extending between said shiftable brake element and said shiftable clutch element within the minimum radii of said segmental brake disk and said segmental clutch disk, spring means normally tending to hold said brake mechanism engaged and said clutch mechanism released, a compressed air power unit comprising an expansible chamber mounted on the outer side of said driving fly wheel, and means for transmitting actuating motion resulting from the expansion of said expansible chamber to said shiftable driven clutch element and thence directly through said motion transmitting shifter mechanism to said shiftable rotatable brake element, whereby the inward shifting movement caused by said power unit is transmitted to said shiftable rotatable brake element before it is transmitted to said segmental driving clutch disc.

9. In air operated clutch-brake mechanism for controlling the starting and stopping of a power driven shaft which is rotatably mounted in a supporting frame and which has one end projecting from said frame, the combination of a power driven fly wheel comprising a web portion and a mounting hub rotatably mounted on said shaft in outwardly spaced relation on said frame, a brake mechanism and a clutch mechanism both mounted concentrically of said shaft between said frame and the web portion of said fly wheel, said brake mechanism comprising a shiftable non-rotating friction brake disk secured to said frame, said clutch mechanism comprising a shiftable driving friction clutch disk secured to said fly wheel, said brake mechanism and said clutch mechanism comprising a non-shiftable mounting sleeve keyed to said shaft between said frame and said fly wheel and having a non-shiftable rotatable brake surface and a non-shiftable driven clutch surface both extending radially outwardly in side-by-side relation from said mounting sleeve and lying between said non-rotating friction brake disk and said driving friction clutch disk for cooperative engagement therewith, a shiftable rotatable brake plate and a shiftable driven clutch plate rigidly connected together to embrace the aforesaid assembly of brake and clutch disks and brake and clutch surfaces, said shiftable rotatable brake plate and said shiftable driven clutch plate being connected together by interconnecting means passing therebetween through apertures in said mounting sleeve located inwardly of the inner peripheries of said non-rotating brake disk and of said driving clutch disk, means normally tending to axially shift said shiftable brake plate and said shiftable clutch plate in a brake-engaging, clutch-releasing direction, a compressed air power unit comprising an expansible chamber mounted on the outer side of said driving fly wheel, and means for transmitting actuating motion resulting from the expansion of said expansible chamber in the opposite direction to said shiftable driven clutch plate and thence directly through said interconnecting means passing through said apertures to said shiftable rotatable brake plate, whereby the inward shifting movement caused by said power unit is transmitted to said shiftable rotatable brake plate before it is transmitted to said shiftable driving cluch disc.

10. In air operated clutch-brake mechanism of the class described for controlling the starting and stopping of a power driven shaft which is rotatably mounted in a supporting frame and which has one end projecting from said frame, the combination of a continuously rotating power driven fly wheel comprising a web portion having rotatable bearing mounting on the projecting end of said shaft, clutch mechanism mounted between said driving fly wheel and said frame for clutching said fly wheel to said driven shaft, brake mechanism mounted between said clutch mechanism and said frame and operative when engaged to exert braking retardation on the rotation of said driven shaft, spring means for normally holding said clutch mechanism released and said brake mechanism engaged, a compressed air power unit operative to release said brake mechanism and engage said clutch mechanism in opposition to the action of said spring means, said compressed air power unit comprising a cylinder and piston mounted on the outer side of said clutch mechanism and on the outer side of said driving fly wheel and rotating continuously with said fly wheel, said clutch mechanism comprising a plurality of aligned shiftable clutch discs, the first or outermost of said shiftable clutch discs located in closest proximity to said compressed air power unit being a driven clutch disc having keyed connection with said driven shaft, the second of said shiftable clutch discs located on the inner side of said outermost clutch disc and adapted to receive inward shifting movement therefrom being a driving clutch disc rotating continuously with said driving fly wheel, said clutch mechanism also comprising an innermost non-shiftable driven clutch disc having keyed connection with said driven shaft, said brake mechanism also comprising a plurality of aligned shiftable brake discs, the innermost of said shiftable brake discs located in closest proximity to said frame having keyed connection with said driven shaft, the next of said shiftable brake discs located on the outer side of said innermost brake disc having non-rotative anchored attachment to said frame, said brake mechanism also comprising an outermost non-shiftable brake disc having keyed connection with said driven shaft, said innermost non-shiftable clutch disc and said outermost non-shiftable brake disc both being formed integral with a common hub which is keyed to said driven shaft, pusher studs mounted for reciprocable movement through the web of said fly wheel for transmitting inward shifting movement from said compressed air power unit to said outermost shiftable clutch disc, and motion transmitting mechanism operative to transmit from said outermost shifable clutch disc to said innermost shiftable brake brake disc the initial inward shifting movement received from said compressed air power unit before said outermost shiftable clutch disc begins transmitting such inward shifting movement to said second shiftable driving clutch disc, said motion transmitting mechanism extending between said outermost shiftable clutch disc and said innermost shiftable brake disc within the minimum radii of said second shiftable driving clutch disc and said shiftable non-rotative brake disc.

11. In air operated clutch-brake mechanism for controlling the starting and stopping of a power driven shaft which is rotatably mounted in a supporting frame and which has one end projecting from said frame, the combination of a power driven fly wheel rotatably mounted on the projecting end of said shaft, clutch mechanism mounted between said driving fly wheel and said frame for clutching said fly wheel to said driven shaft, brake mechanism mounted between said clutch mechanism and said frame and operative when engaged to exert braking retardation on the rotation of said driven shaft, spring means for normally holding said clutch mechanism released and said brake mechanism engaged, a compressed air power unit operative to release said brake mechanism and to engage said clutch mechanism in opposition to the action of said spring means, said compressed air power unit comprising an expansible chamber mounted on the outer side of said clutch mechanism, said clutch mechanism comprising a plurality of aligned shiftable clutch discs, the first or outermost of said shiftable clutch discs in closest proximity to said compressed power unit being a driven clutch disc having keyed connection with said driven shaft, the second of said shiftable clutch discs located on the inner side of said outermost clutch disc and adapted to receive shifting movement therefrom in the engagement of the clutch being a driving clutch disc rotating continuously with said driving fly wheel, said clutch mechanism also comprising an innermost non-shiftable driven clutch disc having keyed connection with said driven shaft, said brake mechanism also comprising a plurality of aligned shiftable brake discs, the innermost of said shiftable brake discs in closest proximity to said frame being rotatable and having a keyed connection with said driven shaft, the second of said shiftable brake discs located on the outer side of said innermost brake disc being non-rotative and having anchored attachment to said frame, said brake mechanism also comprising an outermost non-shiftable brake disc having keyed connection with said driven shaft, and motion transmitting mechanism operative to transmit from said outermost shiftable clutch disc to said innermost shiftable brake disc the initial inward shifting movement which it receives from said compressed air power unit before said outermost shiftable clutch disc begins transmitting such inward shifting movement to said second shiftable driving clutch disc, whereby to effect a very substantial release of said brake mechanism before effecting a very substantial engagement of said clutch mechanism.

References Cited in the file of this patent

UNITED STATES PATENTS

| | | |
|---|---|---|
| 1,869,085 | Williamson | July 26, 1932 |
| 2,151,153 | Rode et al. | Mar. 21, 1939 |
| 2,252,906 | Williamson | Aug. 19, 1941 |
| 2,505,600 | Wissman | Apr. 25, 1950 |
| 2,577,641 | Wissman | Dec. 4, 1951 |
| 2,610,719 | Hornbostel | Sept. 16, 1952 |
| 2,636,581 | Bitler | Apr. 28, 1953 |
| 2,674,356 | Eason | Apr. 6, 1954 |
| 2,767,817 | Davis | Oct. 23, 1956 |
| 2,838,150 | Eason | June 10, 1958 |
| 2,862,589 | Porteous et al. | Dec. 2, 1958 |